Oct. 3, 1933.  A. H. WESSELS  1,929,298
MEANS FOR AND METHOD OF COUNTERACTING HEADLIGHT GLARE
Filed July 17, 1928
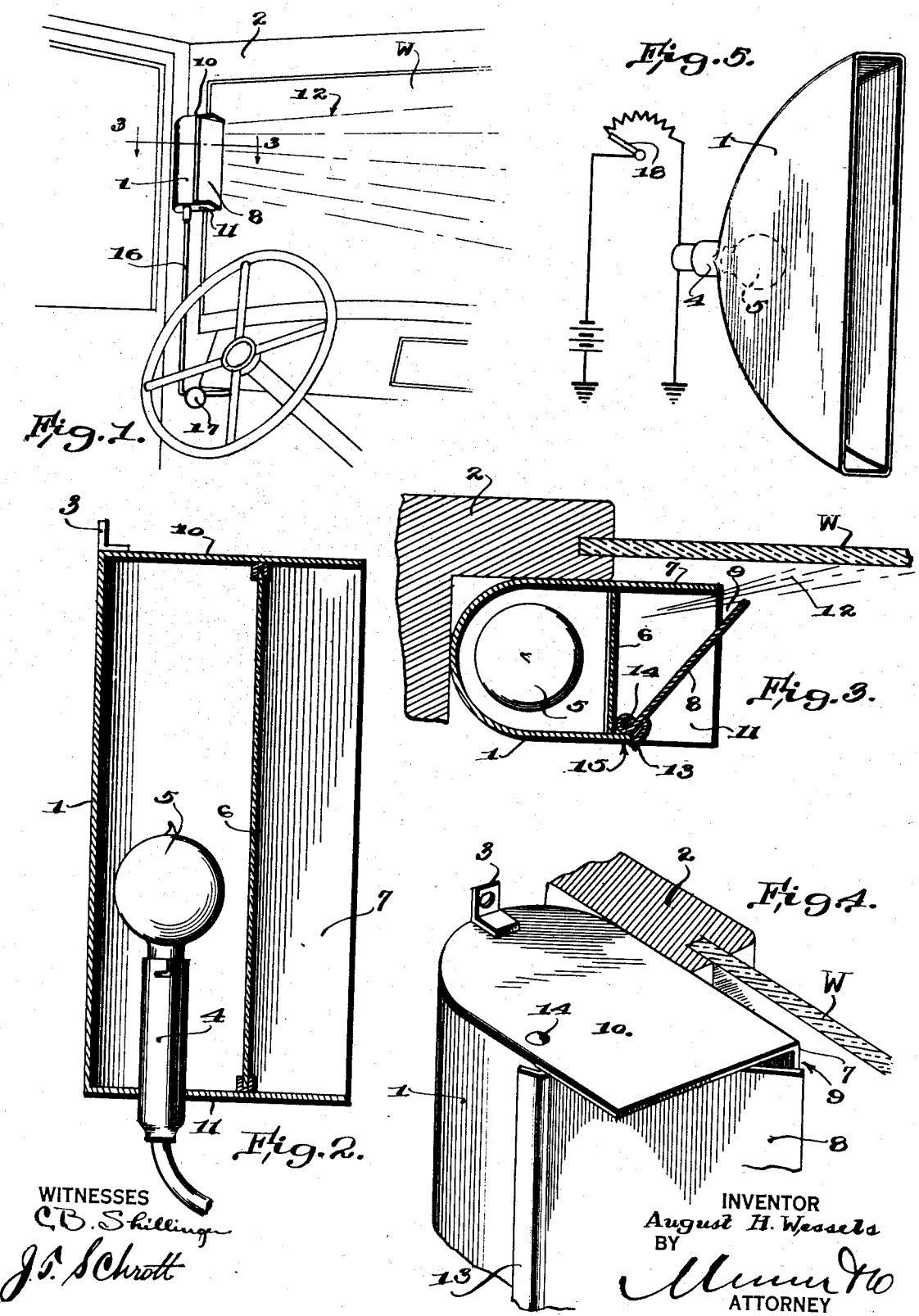
WITNESSES
INVENTOR
August H. Wessels
BY
ATTORNEY Patented Oct. 3, 1933

1,929,298

UNITED STATES PATENT OFFICE 1,929,298

MEANS FOR AND METHOD OF COUNTERACTING HEADLIGHT GLARE

August H. Wessels, Woodbine, Pa.

Application July 17, 1928. Serial No. 293,420

6 Claims. (Cl. 296—97)

This invention relates to improvements in glare shields, and it consists of the constructions, the method of counteracting headlight glare and the advantages herein described and claimed.

An object of the invention is to project across the vision of the driver, and to thus utilize as a glare shield, a band of light as the absorbing or counteracting medium of glaring light from the headlights of on-coming vehicles, the glare shield being rendered operable by the mere expedient of working a switch.

Another object is to convert a band of light, of a color preferably contrasting with the glaring light of on-coming head lamps, into a glare shield.

Other objects and advantages appear in the following specification, reference being had to the accompanying drawing, in which Figure 1 is a perspective view of enough of the inside of a vehicle to show the relationship of the invention to the windshield, Figure 2 is a vertical section of the lamp casing, Figure 3 is a horizontal section taken on the line 3—3 of Figure 1, Figure 4 is a detail perspective view of the upper part of the lamp casing, and a fraction of the windshield, Figure 5 is a diagram of a modified form of the invention.

Much has been said and written about the evils of glaring headlights of automobiles, and although many attempts have been made to confine the rays of light to the proper zone it is nevertheless true that night driving in an automobile has imminent dangers and discomforts directly traceable to the foregoing source. It seems that regardless of how well headlight lenses are made, how frequently the lamp bulbs are adjusted and how zealous motorists may be in equipping their headlights with eye-shades and the like there is still so much of glaring light to greet the eyes of a night driver that the known remedies appear as having been futile.

Rather than to seek a cure for glaring head lamp light by applying the remedy to the source, it is the purpose of the invention to counteract or so modify the glare before it reaches the eyes of the driver that he will perceive nothing but the spots of light representing the on-coming headlights, and will not have his vision impaired as regards other objects which he should see on the road. To these ends the invention is essentially a glare shield but here, again, it affords an improvement over known devices for the purpose, in that screens of various sorts, including colored celluloid, are shunned, as are also the untrustworthy means of fastening them upon the windshield or its surrounding parts.

On the same principle of the absorption of light by the interposition of a screen in the path of the rays thereof, it is herein proposed to utilize a flood, beam, band, ribbon or spot of light as a glare shield. Usually the shielding light will be of a color contrasting with the color of the light it is supposed to modify. It is not material what the source of shielding light is, whether from a lamp with a colored bulb, a source that emits inherently colored light or from a color screen fitted in front of an ordinary clear bulb. By experimentation it has been found that a band of light of any of the spectral colors, when projected across the vision of the driver, will obstruct the glaring light of either on-coming headlights or those reflected from headlights approaching from the rear.

The drawing illustrates two ways of carrying out the invention. According to the first form, a casing 1, affixed to the framework 2 in any suitable manner, for example, by means of an eye 3 and a screw which is not shown, carries any known socket 4 into which an electric lamp bulb 5 is fitted. A color screen 6 is suitably mounted within the casing, completely shutting off that side of the casing which would otherwise be open, and insuring the emission of light only of the color of the screen. A green glass, celluloid or other transparent screen 6 would permit the passage of green light only.

A flange 7 which is an extension of the front side of the casing 1, cooperates with a movable door 8 in forming a slit 9 which is the sole point of egress of the light from the casing. The top 10 and bottom 11 of the casing extend out until they form a square with the flange 7 thus providing shields at the top and bottom of the door and substantially confining the width of the light band 12 to the height of the slit 9.

An outstanding heel 13 on the door 8 both tends to limit the opening movement of the door and to shield any crevices in and around the hinge 14. For these purposes the screen 6 is set sufficiently far into the casing 1 that the heel 13 may co-act with what then becomes a flange 15 at the bottom edge of the casing. The mounting of the door 8 should be that of a friction hinge, that is to say, a hinge which is sufficiently tight in its joints to cause the door to stay in the position to which it is adjusted.

No means is shown to account for the replacement of the color screen 6. In practice the screen may be composed either of a flexible or rigid substance, and the modes of introducing and holding it would vary with the nature of the substance. For instance, a celluloid screen might simply be bowed and slipped into guides, while a glass screen would require some kind of a slot for its insertion.

Reverting to the socket 4, a connection may be made with the source of current which would usually be the storage battery. 16 represents a part of the electrical circuit which embraces the lamp 5. The circuit is controlled by a switch 17, so that the mere operation of the switch renders a glare shield operative and inoperative. The foregoing description indicates that an electric lamp 5 and electrical current are preferably used as the lighting medium, but so far as the principle of the invention is concerned any source of light, with means equivalent to the switch 17 for controlling it, may be employed.

According to the second form of the invention in Figure 5, in which parts corresponding with the first form of the invention are designated by similar characters, the lamp bulb 5 is located at the focus of the casing 1 which is parabolic in this respect:—The casing is quite narrow, but sufficiently wide to enable the fitting of the bulb in the socket 4 which is introduced from the rear. The sides of the casing would ordinarily be parallel as shown, so that the emitted band of light will be relatively thin but rather broad. Certain edges of the sides are cut in the shape of a parabola and it is across these edges that the reflecting back occurs, it being between the focal point of this parabolic back in which the lamp is located as already stated.

No lens is shown across the elongated opening of the casing 1 in Figure 5, but in practice a lens may be employed if desired. In this instance the bulb 5 is to be colored, that is to say, appropriately treated so that it will give off a colored light. It is also possible to employ an element in the lamp that will give off an inherently colored light. In the case of a colored lamp no color screen would be needed, but the form of the invention in Figure 5 will readily lend itself to the use of a color screen across the elongated opening and of a clear bulb in place of the colored bulb there proposed.

In place of the switch 17 it is intended to insert a rheostat 18 in the electrical circuit, by means of which the brilliancy of the emitted light can be controlled between maximum and zero points. This feature will have its advantages. The driver may select a point on the rheostat at which the brilliancy of the emitted light will be sufficient to absorb the halo of conflicting lights under ordinary circumstances, but should an occasion arise when the on-coming headlights are exceptionally bright and annoying he may turn the rheostat on full force so that the increased brilliancy of the emitted light will have a greater counteracting power.

The operation will be readily understood, and here it will be apparent that the invention involves a method as well as means for counteracting the glare of on-coming headlights. The lamp casing 1 is preferably attached to the left side of the framework 2 surrounding the windshield W, which naturally will have a slight film of light arresting media upon it, no matter how carefully or how often it may be cleaned. The lamp need not be confined to this position because it might be attached above or below or in fact in any position from which the band of light 2 would be projected across the vision of the driver.

The fundamental idea of interposing a zone of contrasting light between the eyes of the driver and on-coming headlights lends itself to a number of manifestations. The disclosure in this applicatin is that of means for producing a band of light, but the purpose would be served by a beam which, generally, is round in cross section and of a conical shape, or a spot of light. The production of the band of light does not necessarily demand the adjustable door or shuter 8 in Figure 3, because the adjustment of the thickness of the band can be fixed as contemplated by Figure 5.

Inasmuch as the glare shield will primarily be used at night, the light band 12 will be visible by virtue of its contrast with the outer darkness. But contrast alone need not be resorted to for the visibility of the light band, because the latter may be so directed as to illuminate a portion of the inside of the windshield glass. In either case the driver would look through a colored zone. The thickness of the light band is adjustable by opening and closing the door 8 in order to vary the width of the slit 9. The intensity of the light band is controlled by inserting stronger or weaker lamps 5, or as in the case of the modification by means of the rheostat 18. The width of the band would be controlled by the height of the slit 9, and although no means for adjustment of the width is afforded yet it is obvious that a long lamp casing would permit the production of a wide beam, whereas a short casing would result in a narrow beam.

Upon turning on the switch 17 or the rheostat 18, the light will be emitted from the lamp 5. The adjacent closed side of the casing 1 is curved in order to reflect as much light as possible upon the screen 6. The latter being colored will permit the passage of only light of the same color, but in doing so will absorb the halo. A green screen would cause a green light band 12, and the quality of this band is such as to absorb all straying and glaring lights from on-coming head lamps that would otherwise reach the eyes of the driver. All that he will see, so far as light is concerned will be green spots representing the head lamps themselves. But the color band 12 will not perceptibly obscure other objects. The driver can see through the colored band 12 slightly better than he could if a celluloid screen were interposed before his eyes and objects of the road.

The theory on which this invention seems to operate is that the colored light is reflected by imperfections in the windshield and also by dust particles on both sides of the windshield. For this reason Triplex safety glass apparently gives better results perhaps because of the imperceptible reflecting "surfaces" at the points of contact of the different ply. It is of course obvious that if perfectly transparent glass were obtainable and if such glass had perfectly smooth surfaces and further if there were no dust in the air none of the colored light would be reflected. But such perfection is practically impossible and under all ordinary circumstances the results obtained are satisfactory. The reflected colored light softens the glare of the oncoming headlights in much the same way as a film of colored paint or celluloid on the windshield with this difference in that the latter is entirely transmitted light while in the present case most of the light is reflected. Other theories might be given to explain the phenomena and it is understood that the scope of the claims is in no wise restricted by the above theory or any other that might be given.

While the construction and arrangement of the improved glare shield is that of a generally preferred form, obviously modifications and changes may be made without departing from the spirit of the invention or the scope of the claims.

I claim:—

1. The method of protecting an automobile driver from the effects of the glare of approaching headlights which consists in throwing a colored spot of light on the windshield in front of the driver at approximately the level of his eyes.

2. The method of protecting the driver of a vehicle provided with a windshield from the effects of glaring headlights, which consists in imposing a spot of colored light on the inside surface of the windshield between the driver's eyes and the source of glare to act as a glare shield thru which he may view the offending headlights without danger.

3. The method of protecting an automobile driver from the effects of the glare of approaching headlights which consists in directing a narrow beam of colored light horizontally across the windshield in front of the driver at an acute angle to the windshield, and varying the intensity of the beam in accordance with the glare to be neutralized.

4. A glare reducer comprising a transparent means between the eyes and the source of glare and means for projecting a zone of green light on said transparent means.

5. A glare reducer as defined in claim 4 having means for varying the intensity of the green light.

6. Means for counteracting headlight glare comprising a projector of colored light located adjacent the windshield and arranged to throw a spot of colored light thereon, means on the projector for controlling the spread of the spot and additional means for varying the intensity of the light in the spot.

AUGUST H. WESSELS.